United States Patent
Varchavtchik et al.

(10) Patent No.: US 9,021,166 B2
(45) Date of Patent: Apr. 28, 2015

(54) SERVER DIRECT ATTACHED STORAGE SHARED THROUGH PHYSICAL SAS EXPANDERS

(75) Inventors: Luiz D. Varchavtchik, Wichita, KS (US); Reid A. Kaufmann, Andover, KS (US); Jason A. Unrein, Wichita, KS (US)

(73) Assignee: LSI Corporation, San Jose, CA (US)

( * ) Notice: Subject to any disclaimer, the term of this patent is extended or adjusted under 35 U.S.C. 154(b) by 34 days.

(21) Appl. No.: 13/550,799

(22) Filed: Jul. 17, 2012

(65) Prior Publication Data
US 2014/0025850 A1    Jan. 23, 2014

(51) Int. Cl.
*G06F 13/12* (2006.01)
*G06F 3/06* (2006.01)

(52) U.S. Cl.
CPC ............ *G06F 3/0689* (2013.01); *G06F 3/0607* (2013.01)

(58) Field of Classification Search
None
See application file for complete search history.

(56) References Cited

U.S. PATENT DOCUMENTS

| | | | |
|---|---|---|---|
| 2006/0020711 A1 | 1/2006 | Nguyen et al. | |
| 2007/0070535 A1* | 3/2007 | Fujitani | 360/46 |
| 2008/0140898 A1* | 6/2008 | Bacom et al. | 710/300 |
| 2009/0094620 A1* | 4/2009 | Kalwitz et al. | 719/325 |
| 2010/0049919 A1* | 2/2010 | Winokur et al. | 711/114 |
| 2010/0064060 A1* | 3/2010 | Johnson et al. | 710/2 |
| 2010/0153639 A1* | 6/2010 | Corry et al. | 711/113 |
| 2010/0268687 A1 | 10/2010 | Zembutsu | |
| 2011/0219170 A1* | 9/2011 | Frost et al. | 711/103 |

* cited by examiner

*Primary Examiner* — Henry Tsai
*Assistant Examiner* — Aurangzeb Hassan
(74) *Attorney, Agent, or Firm* — Suiter Swantz pc llo

(57) ABSTRACT

A system and method for servers to belong to a cascaded cluster of nodes (or servers) is disclosed. Servers share storage in common without the need of an external element such as a switch and or external storage device. SAS technology is used with direct attached drives in each node, and connections between each node, to emulate a SAN environment through a cascaded SAS topology. SAS HBAs each containing an SAS expander, connect elements internal to each server with elements external to each. This cascaded DAS clustering enables bi-directional traffic from each server in the cluster to all other servers and their attached drives.

10 Claims, 5 Drawing Sheets

600

| | |
|---|---|
| 602 | connecting a plurality of servers in a cascaded DAS cluster, said cascaded DAS cluster comprising at least two of said plurality of servers |
| 604 | associating at least two host bus adapters (HBA) with each one of said plurality of servers, said at least two host bus adapters having:<br>an SAS expander<br>a peripheral component interconnect (PCI) processor having PCI logic embodied therein at least 8 external PHYs and at least 16 internal PHYs |
| 606 | configuring internal server connectivity between said SAS expander and a plurality of drives |
| 608 | configuring external server connectivity between said plurality of servers in said cascaded DAS cluster |
| 610 | connecting a first SAS expander on a first one of said plurality of servers to a subsequent first SAS expander on a subsequent one of said plurality of servers via a first connection pattern |
| 612 | connecting a second SAS expander on said first one of said plurality of servers to a subsequent second SAS expander on said subsequent one of said plurality of servers via a second connection pattern |
| 614 | configuring a connectivity between said first SAS expander and at least one subsequent SAS expander via a fail over link |

FIG. 6

SERVER DIRECT ATTACHED STORAGE SHARED THROUGH PHYSICAL SAS EXPANDERS

TECHNICAL FIELD

The present disclosure relates generally to the field of storage management of storage semiconductors & protocols (e.g. ROCs, SAS, SATA, expanders, FC, PCIe). More specifically, embodiments of the present invention relate to methods for shared storage between a cluster of servers connected by physical SAS expanders.

BACKGROUND

Finite server memory capacity may require an operator to increase system capabilities which are designed to most efficiently use the capacity. Server memory may reach storage capacity limits with ever increasing file/application size. A method providing access to previously inaccessible memory may enable a user to more efficiently manage storage assets.

Cloud computing, which may utilize clustering for redundancy, is on the rise. Clustering as used herein may be defined as grouping objects into clusters so same-cluster objects maintain similarity absent outside the cluster.

Traditionally, one of the following configurations for storage sharing may have comprised:
1. each node may connect to a common Storage Area Network (SAN) fabric, which may provide a low latency block interface to storage;
2. each node may connect to an Ethernet network, utilizing file access to shared storage;
3. external collection of drives, in practice sometimes referred to as just a bunch of drives (JBOD)s;
4. direct attached drives (internal).

Each of the above methods may cause considerable increase in cost or decrease in speed. The SAN fabric method and the Ethernet method may require an additional external Fiber or Ethernet switch. The external switch may connect all the nodes to common storage forming a type of cluster.

Precariously, this additional external switch may become a single point of failure. Therefore, a redundant component may be required to ensure a desired level of availability while also, unfortunately, increasing cost.

The SAN fabric method, the Ethernet method, and the JBOD method may require storage housed in costly external enclosures. These enclosures may increase power usage, space required, and necessary maintenance. Simply, storage requirements (redundancy and common access) for a high level of availability in clustering, present problematic increased costs and increased user complexity.

Physical limitations also pose challenges to certain types of traditional clustering schemes. External JBODs may present a compromise between redundancy and cost. Although utilizing a SAS (Serially Attached SCSI) expander within each node may provide connectivity to internal drives and other nodes, this compromise may also limit the number of nodes in a cluster to the number of connectors on the JBOD. This limitation may prove too constrictive and thus, unacceptable.

Additional financial disadvantages of the external JBOD model may include the cost of: (1) powering external units, (2) a unit cost of external enclosures, (3) extra connections, and (4) extra physical space required. The disadvantage of adding an independent SAS expander board or external unit to each node may be a primary additional cost of the space used inside the chassis.

A traditional Direct attached drive option may have traditionally proven to be the most economical. However, one drawback of this option may include a lack of provision for high availability clustering since there is no ability for shared storage.

Therefore, it would be advantageous if a method and system existed providing a capability for servers to belong to a cluster of nodes (or servers), sharing storage in common, without the need of an external element such as a switch and or external storage.

SUMMARY

In a preferred embodiment, a system for A system for server direct attached storage (DAS) shared through physical Server Attached Small Computer System Interface (SAS) expanders comprises a plurality of servers, the plurality of servers organized into a cascaded DAS cluster. The cascaded DAS cluster comprises at least two of the plurality of servers, at least two host bus adapters (HBA) operably associated with each one of the plurality of servers. Each of the at least two host bus adapters having: an SAS expander, a peripheral component interconnect (PCI) processor having PCI logic embodied therein, at least 8 external PHYs, and at least 16 internal PHYs. Within the server, an internal connectivity configuration connects the SAS expander and a plurality of drives. External to each server, an external connectivity configuration connect each of the plurality of servers in the cascaded DAS cluster. The connection configuration comprises: a first SAS expander on a first one of the plurality of servers connects to a subsequent first SAS expander on a subsequent one of the plurality of servers via a first connection pattern, and a second SAS expander on the first one of the plurality of servers connects to a subsequent second SAS expander on the subsequent one of the plurality of servers via a second connection pattern. A fail over connection between the first SAS expander and at least one subsequent SAS expander is provided via a fail over link. These connection configurations allow each of the plurality of drives of the first one of the plurality of servers to communicate bi-directionally with the subsequent one of the plurality of servers.

In an additional aspect of the current invention, a method for server direct attached storage (DAS) shared through physical Server Attached Small Computer System Interface (SAS) expanders, comprises connecting a plurality of servers in a cascaded DAS cluster. The cascaded DAS cluster comprises at least two of the plurality of servers. The clustering is accomplished by associating at least two host bus adapters (HBA) with each one of the plurality of servers. The host bus adapters each having: an SAS expander, a peripheral component interconnect (PCI) processor having PCI logic embodied therein, at least 8 external PHYs, and at least 16 internal PHYs. Within each of the servers, the HBA communicates via internal server connectivity between the SAS expander and a plurality of drives. Externally to the server, connectivity between the plurality of servers in the cascaded DAS cluster is accomplished by a first SAS expander on a first one of the plurality of servers connecting to a subsequent first SAS expander on a subsequent one of the plurality of servers via a first connection pattern. A second SAS expander on the first one of the plurality of servers connects to a subsequent second SAS expander on the subsequent one of the plurality of servers via a second connection pattern. Fail over protection is accomplished by a connectivity configuration between the first SAS expander and at least one subsequent SAS expander via a fail over link. This cascaded DAS clustering provides for each one of the plurality of drives of the each one of the plurality of servers to communicate bi-directionally, via the first connection pattern and the second connection pattern, with the each one of the plurality of servers in the cascaded DAS cluster.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 6 is a logic flow diagram of a preferred method representative of the present invention;

DETAILED DESCRIPTION

Reference will now be made in detail to the subject matter disclosed, which is illustrated in the accompanying drawings.

Embodiments of the present invention may provide the capability for servers to belong to a cluster of nodes (or servers). Such a cluster may share common storage without the need of an external switching element or an external storage element. Serial attached small computer system interface (SAS) technology used with direct attached storage (DAS) in each node, and connected between each node, may emulate a SAN environment through a cascaded SAS topology. A plurality of servers configured and connected in a cluster may create a cascaded DAS cluster. Current servers may have drives currently embedded within, such drives connectable through SAS. Such connectivity may remove the need for an external storage as long as the internal storage may be shared among other servers. Additionally, SAS Host Bus Adapters (HBAs) capable of emulating an expander may be used, enabling bi-directional traffic to all other nodes and their attached drives.

Preferably, each node has an SAS connection to two other nodes. The first and last node would also be connected via SAS, but the connection would be disabled (to prevent a loop, which is an invalid SAS topology). In the event of node going down, the disabled connection would be immediately enabled by firmware to ensure uninterrupted access to all nodes in the event of any single node failure. Each node contains local SAS (or SATA) storage accessible to all nodes. Dual paths to all end devices may be utilized for redundancy.

Figure 1:
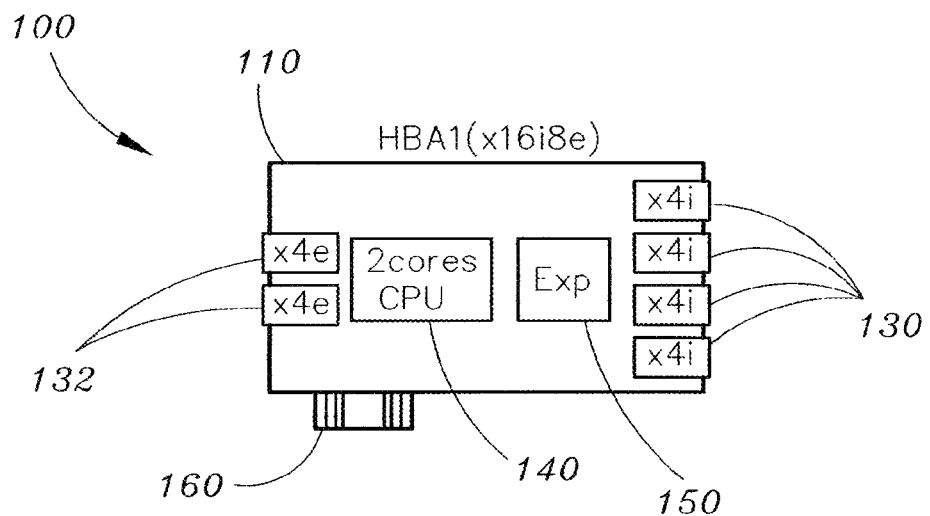
FIG. 1 is a diagram of a Host Bus Adapter (HBA) configurable for use in a preferred embodiment of the present invention.

Referring to FIG. 1, a diagram of a Host Bus Adapter (HBA) configurable for use in a preferred embodiment of the present invention is shown. HBA 110 may comprise a communications link between internal components of a system and components external to the system. Preferably, a 24 PHY HBA may be employed to accomplish the required number of internal and external interconnects. HBA 110 may comprise at least 8 external PHYs 132 and 16 internal PHYs 130 to properly communicate. 2 Cores CPU 140 may house PCI and SAS controller logic. Physical expander 150 may preferably comprise crossbar architecture to enable efficient multi-drive communication. Edge connecter 160 may allow HBA 110 connectivity to and placement on a system motherboard.

Figure 2:
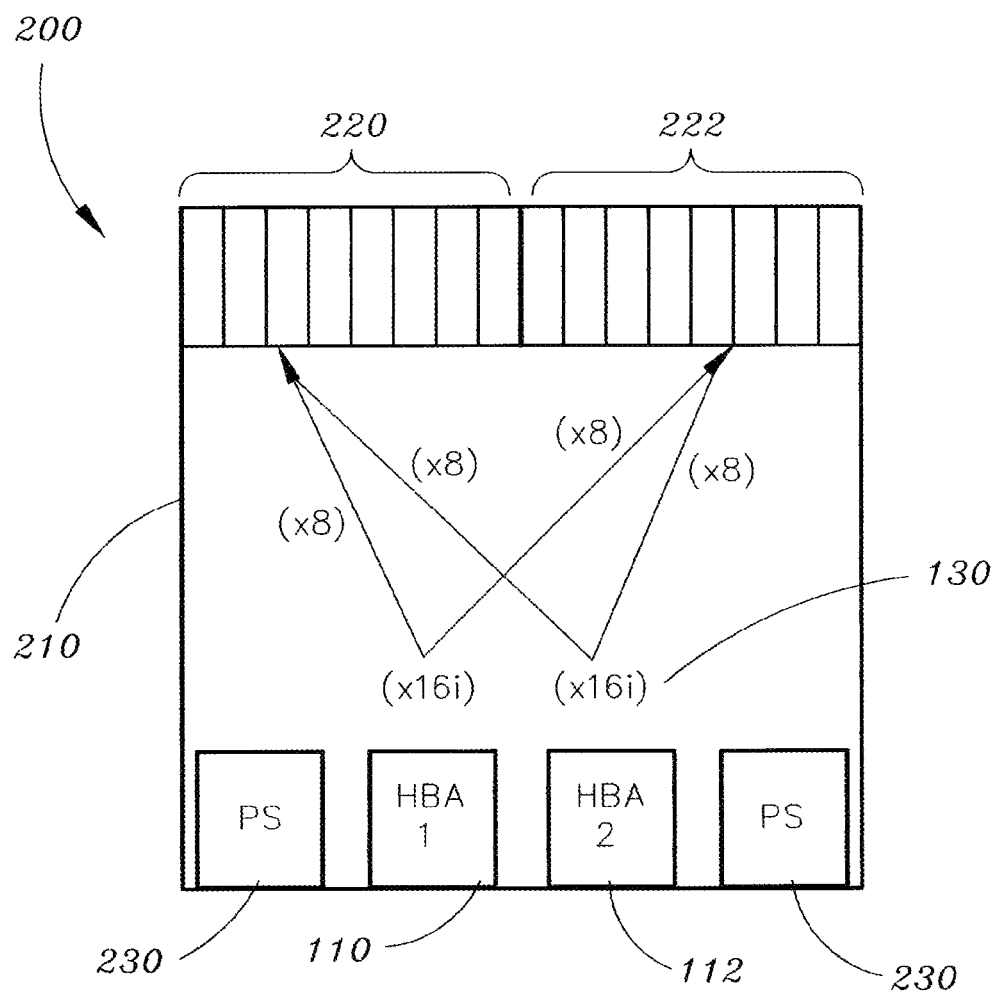
FIG. 2 is a diagram of an internal layout of a server in accordance with a preferred embodiment of the present invention.

Referring to FIG. 2, a diagram of an internal layout of a server in accordance with a preferred embodiment of the present invention is shown. Server 210 may comprise a first HBA 110, and a second HBA 112 to properly communicate with internal drives 1-8 220 and 9-16 222. First HBA 110 may concurrently connect, via crossbar architecture, with internal drives 1-8 220 and internal drives 9-13 222. Second HBA 112 may also enable concurrent communication with internal drives 1-8 220 and internal drives 9-13 222 via crossbar architecture. Each one of the HBAs 110, 112 may require 16 internal PHYs 130 to properly communicate with internal drives 220, 222. Power source 230 may provide electrical supply to component parts.

Figure 3:
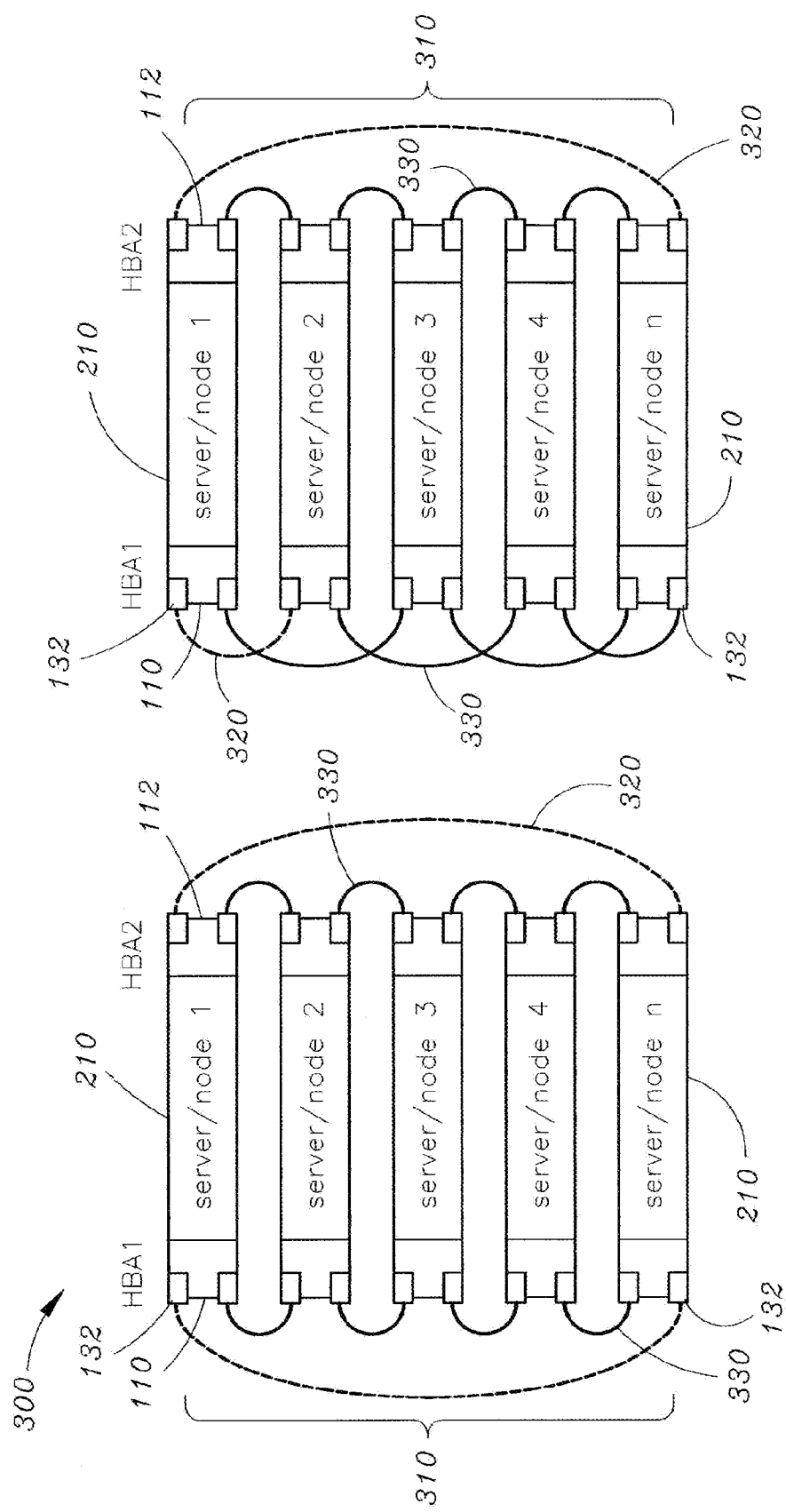
FIG. 3a is a diagram of a configuration for a cascaded direct attached storage (DAS) cluster representative of a preferred embodiment of the present invention.
FIG. 3b is a diagram of a configuration for a cascaded DAS cluster representative of an additional embodiment of the present invention.

Referring to FIG. 3a, a diagram of a configuration for a cascaded direct attached storage (DAS) cluster representative of a preferred embodiment of the present invention is shown. It is contemplated there may be an unlimited number of servers 210 present in a DAS cluster 310. Each server 210 may comprise first HBA 110 and second HBA 112 for connectivity between servers and drives. As shown in FIG. 1, external PHY 132 may be the actual connection port for each server 210 connected by external SAS cable 330 while internal PHY 130 may provide the connection point for the drives 220, 222. DAS cluster 310 may comprise a plurality of connectivity options as referenced. In the present example, server/node 1 may connect with server/node 2 via First HBA 110 and second HBA 112. This mirror image connectivity configuration may enable redundant connectivity between and among each server/node. Similarly, server/node 2 may connect to server/node 3, 3 to 4 and continuing in an n to n+1 pattern. For redundancy, fail over link 320 may connect server/node 1 to server/node n.

Referring to FIG. 3b, a diagram of a configuration for a cascaded DAS cluster representative of an additional embodiment of the present invention is shown. An unlimited number of servers/nodes may be incorporated into the cluster 310 example of 3a as well. Connectivity configuration options may comprise first HBA connectivity following a pattern of n to n+2 via external SAS Cable 330. For example, server/node 1 may connect to server/node 3, 2 to 4 and so on. As the cluster comes to an ending server/node n, the first HBA connection may be completed with an n−1 to n connection. Fail over link 320 may connect server/node 1 to server/node 2 on the first HBA 110 side.

Unlike the example of 3a, the example 3b, second HBA 112 connections may follow a non-mirror path from that of first HBA 110 connections. HBA 2 112 connections may follow a n to n+1 pattern, with the fail over link 320 preferably connected from server/node 1 to server/node n.

Figure 4:
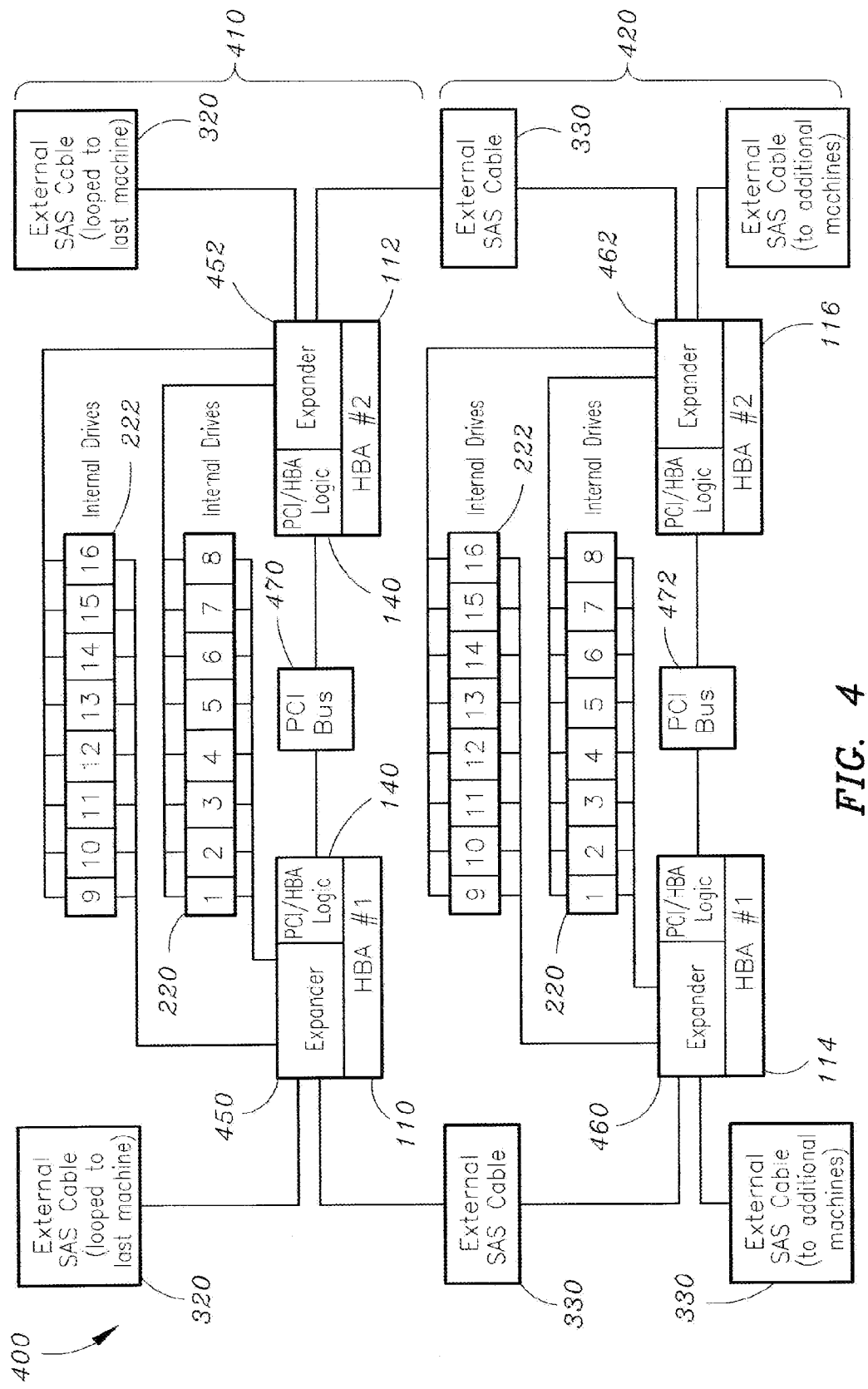
FIG. 4 is an expanded diagram of an example cascaded DAS cluster representative of a preferred embodiment of the present invention.

Referring to FIG. 4, an expanded diagram of an example cascaded DAS cluster representative of a preferred embodiment of the present invention is shown. Cluster 400 may represent a similar example of server/node 210 connectivity configuration as that shown in FIG. 3a (n to n+1 on both first HBA 110 and second HBA 112 connectivity). Cluster 400 may comprise an unlimited number of server/nodes. For exemplary purposes, server/node 410 and server/node 420 are shown as an exemplary two of possible unlimited number. As outlined above, each HBA comprises an expander, PCI logic, and associated PHYs to accomplish connectivity.

On a first side of the present embodiment, expander 450 (with associated PHY elements) of first HBA 110 may provide the connectivity between the individual elements. Expander 450 may operably connect with a last server/node n via fail over cable 320, with expander 460 of first HBA of server/node 420, with PCI bus 470, and with server/node 410 internal drives 430. Expander 450 may operably connect with each of the internal drives 220, 222 for direct access to each of the plurality (16 here) of drives.

On a second side of the present embodiment cluster 400, second HBA 112 may provide connectivity to the plurality of elements. Expander 452 may operably connect 1) via SAS topology with system/node n via fail over link 320, 2) with expander 462 of HBA 116 on system/node 420, 3) with PCI bus 470 through PCI/HBA logic 140, and 4) with each of the individual internal drives 220, 222 via crossbar architecture.

Each additional server/node in the cluster 400 may maintain similar internal connections within the server/node as shown. Specifically, each HBA may operably connect across each system/node as does system node 420 via PCI bus 472. One difference between embodiments herein, as previously discussed, may include topology of SAS external connections 330.

Figure 5:
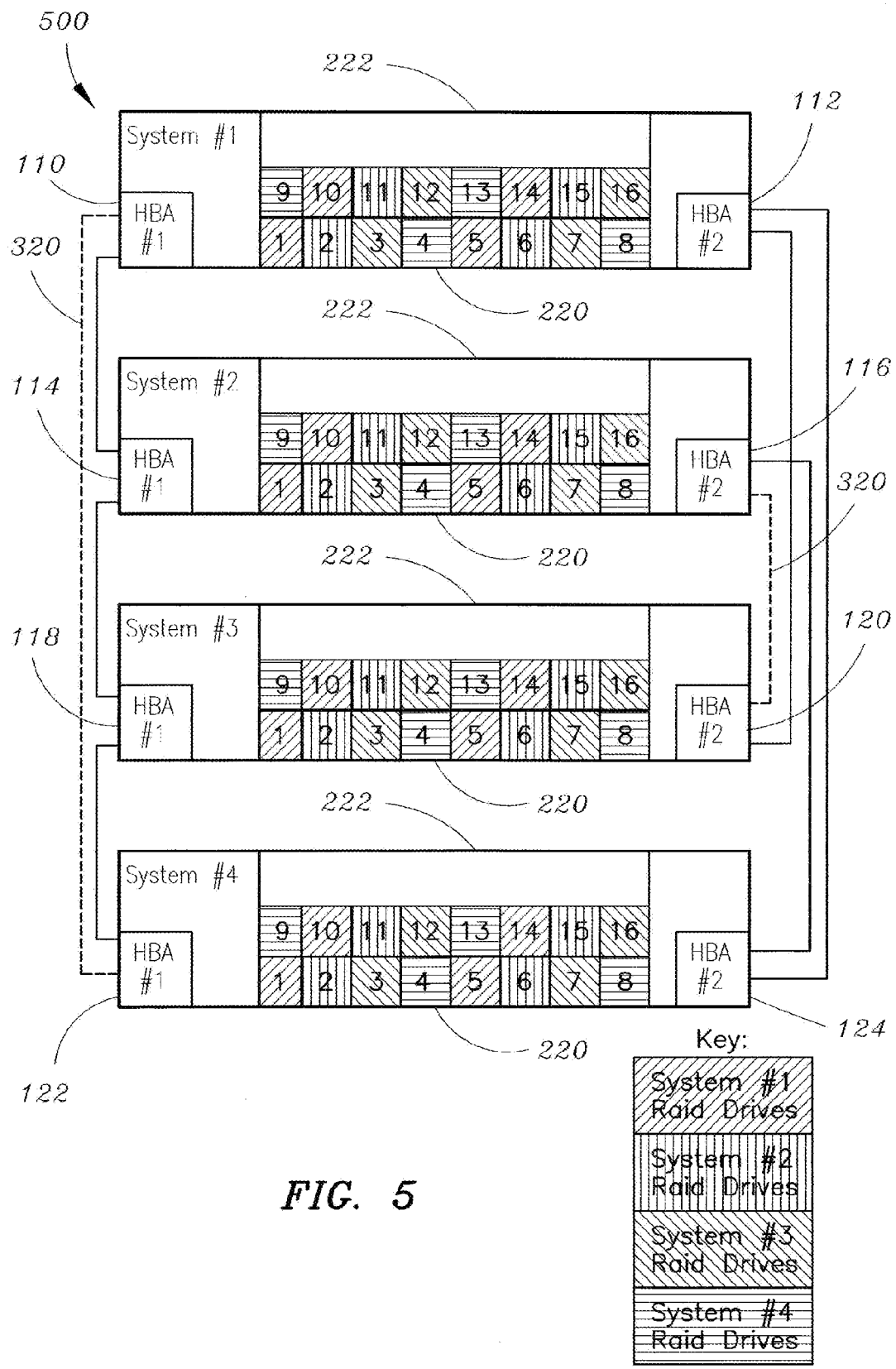
FIG. 5 is an expanded diagram of an example implementation Cascaded DAS Cluster representative of a preferred embodiment of the present invention.

Referring to FIG. 5, an expanded diagram of an example implementation Cascaded DAS Cluster representative of a preferred embodiment of the present invention is shown. Cluster 500 may further indicate a redundant array of independent drives (RAID) topology of the present invention. System/nodes may be connectable on a first side using a n to n+1 pattern as previously discussed. System/nodes may be connectable on a second side using an n to n+2 pattern as previously discussed. Preferably, system 1 RAID drives may comprise drives 1, 10, 5, and 14; system/node 2 RAID drives may comprise drives 2, 11, 6, and 15; system/node 3 RAID drives may comprise drives 3, 12, 7, and 16; and system/node 4 RAID drives may comprise drives 4, 13, 8, and 9. Fail over link 320 may connect system/nodes 1 with 4 and 2 with 3.

Referring to FIG. 6, a logic flow diagram of a preferred method representative of the present invention is shown. Step 602 may comprise connecting a plurality of servers in a cascaded DAS cluster, the cascaded DAS cluster comprising at least two of the plurality of servers. At step 604, the method may associate at least two host bus adapters (HBA) with each one of the plurality of servers, the at least two host bus adapters having: an SAS expander, a peripheral component interconnect (PCI) processor having PCI logic embodied therein, at least 8 external PHYs, and at least 16 internal PHYs.

Step 606 may comprise configuring internal server connectivity between the SAS expander and a plurality of drives. At step 608, the method may configure external server connectivity between the plurality of servers in the cascaded DAS cluster. The method may connect a first SAS expander on a first one of the plurality of servers to a subsequent first SAS expander on a subsequent one of the plurality of servers via a first connection pattern at step 610.

Step 612 may comprise connecting a second SAS expander on the first one of the plurality of servers to a subsequent second SAS expander on the subsequent one of the plurality of servers via a second connection pattern. Step 614 may comprise a connectivity configuration between the first SAS expander and at least one subsequent SAS expander via a fail over link. Each one of the plurality of drives of the each one of the plurality of servers is configured to communicate bi-directionally, via the first connection pattern and the second connection pattern, with the each one of the plurality of servers in the cascaded DAS cluster.

It should be recognized that while the above description describes the concept of server driven de-duplication or server memory, the above description does not represent a limitation but merely an illustration.

In the present disclosure, the methods disclosed may be implemented as sets of instructions or software readable by a device. Such software may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system for server direct attached storage (DAS) shared through physical Server Attached Small Computer System Interface (SAS) expanders, comprising:
 a plurality of servers, said plurality of servers organized into a cascaded DAS cluster, said cascaded DAS cluster comprising at least two of said plurality of servers;
 at least two host bus adapters (HBA) operably associated internally with each one of said plurality of servers, said at least two host bus adapters having:
  an SAS expander;
  a peripheral component interconnect (PCI) processor having PCI logic embodied therein;
  at least 8 external PHYs;
  at least 16 internal PHYs;
  an internal connectivity configuration, internal to each one of said plurality of servers, between said SAS expander and a plurality of drives;
  an external connectivity configuration between said plurality of servers in said cascaded DAS cluster comprising:
   a first SAS expander on a first one of said plurality of servers connects to a subsequent first SAS expander on a subsequent one of said plurality of servers via a first connection pattern; and a second SAS expander on said first one of said plurality of servers connects to a subsequent second SAS expander on said subsequent one of said plurality of servers via a second connection pattern; and a connectivity configuration between said first SAS expander and at least one subsequent SAS expander via a fail over link;

wherein each of said plurality of drives of said first one of said plurality of servers communicates bi-directionally with said subsequent one of said plurality of servers;

wherein said at least two host bus adapters' peripheral component interconnect (PCI) processors having PCI logic embodied therein operably connect said at least two host bus adapters across each of said plurality of servers.

2. The system of claim 1, wherein said first connection pattern is n to n+1 and said second connection pattern is n to n+1, wherein n is a number associated with a server.

3. The system of claim 1, wherein said first connection pattern and said second connection pattern are equal.

4. The system of claim 1, wherein said first connection pattern is n to n+2 and said second connection pattern is n to n+2, wherein n is a number associated with a server.

5. The system of claim 1, wherein said fail over link connects a subsequent SAS expander to a third subsequent SAS expander.

6. A method for server direct attached storage (DAS) shared through physical Server Attached Small Computer System Interface (SAS) expanders, comprising:

connecting a plurality of servers in a cascaded DAS cluster, said cascaded DAS cluster comprising at least two of said plurality of servers;

associating at least two host bus adapters (HBA) internally with each one of said plurality of servers, said at least two host bus adapters having:
  an SAS expander;
  a peripheral component interconnect (PCI) processor having PCI logic embodied therein;
  at least 8 external PHYs;
  at least 16 internal PHYs;

configuring internal server connectivity between said SAS expander and a plurality of drives;

configuring external server connectivity between said plurality of servers in said cascaded DAS cluster, said external server connectivity comprising:
  a first SAS expander on a first one of said plurality of servers connects to a subsequent first SAS expander on a subsequent one of said plurality of servers via a first connection pattern; and
  a second SAS expander on said first one of said plurality of servers connects to a subsequent second SAS expander on said subsequent one of said plurality of servers via a second connection pattern; and configuring a connectivity between said first SAS expander and at least one subsequent SAS expander via a fail over link;

wherein each one of said plurality of drives of said each one of said plurality of servers communicates bi-directionally, via said first connection pattern and said second connection pattern, with said each one of said plurality of servers in said cascaded DAS cluster;

wherein said at least two host bus adapters' peripheral component interconnect (PCI) processors having PCI logic embodied therein are operably connected to said at least two host bus adapters across each of said plurality of servers to further enable redundant connectivity.

7. The method of claim 6, wherein said first connection pattern is n to n+1 and said second connection pattern is n to n+1, wherein n is a number associated with a server.

8. The method of claim 6, wherein said first connection pattern and said second connection pattern are equal.

9. The method of claim 6, wherein said first connection pattern is n to n+2 and said second connection pattern is n to n+2, wherein n is a number associated with a server.

10. The method of claim 6, wherein said fail over link connects a subsequent SAS expander to a third subsequent SAS expander.

* * * * *